United States Patent
Orisaka et al.

(10) Patent No.: US 9,825,279 B2
(45) Date of Patent: Nov. 21, 2017

(54) POWDER SUPPLY DEVICE FOR SECONDARY BATTERY AND APPARATUS FOR MANUFACTURING ELECTRODE BODY

(71) Applicants: TOYOTA JIDOSHA KABUSHIKI KAISHA, Toyota-shi, Aichi (JP); ZEON CORPORATION, Tokyo (JP)

(72) Inventors: Eiji Orisaka, Nissin (JP); Yasuhiro Sakashita, Nissin (JP); Ryo Nakatani, Kawasaki (JP); Naohiro Hasama, Kamakura (JP); Yuji Shibata, Kawasaki (JP)

(73) Assignees: TOYOTA JIDOSHA KABUSHIKI KAISHA, Toyota-shi, Aichi-ken (JP); Zeon Corporation, Tokyo (JP)

( * ) Notice: Subject to any disclaimer, the term of this patent is extended or adjusted under 35 U.S.C. 154(b) by 219 days.

(21) Appl. No.: 14/429,003

(22) PCT Filed: Sep. 24, 2013

(86) PCT No.: PCT/JP2013/075777
§ 371 (c)(1),
(2) Date: Mar. 18, 2015

(87) PCT Pub. No.: WO2014/050835
PCT Pub. Date: Apr. 3, 2014

(65) Prior Publication Data
US 2015/0255778 A1    Sep. 10, 2015

(30) Foreign Application Priority Data
Sep. 25, 2012    (JP) .................................. 2012-210970

(51) Int. Cl.
*B23P 19/00* (2006.01)
*H05K 13/04* (2006.01)
(Continued)

(52) U.S. Cl.
CPC ............. *H01M 4/0402* (2013.01); *B05C 9/06* (2013.01); *B05C 9/12* (2013.01); *B05C 19/04* (2013.01);
(Continued)

(58) Field of Classification Search
CPC ..... B05B 5/0418; B05B 5/081; B05B 5/1683; B05B 7/144; B05C 9/06; B05C 9/12;
(Continued)

(56) References Cited

U.S. PATENT DOCUMENTS 2,681,637 A * 6/1954 Simpson .................. D21H 3/64
118/308
4,518,261 A * 5/1985 Sekimoto .............. B01F 3/1221
366/155.1
(Continued)

FOREIGN PATENT DOCUMENTS

EP    0528613 A2    2/1993
GB    832523    4/1960
(Continued)

OTHER PUBLICATIONS

International Search Report of PCT/JP2013/075777, dated Nov. 26, 2013. [PCT/ISA/210].

*Primary Examiner* — Paul D Kim
(74) *Attorney, Agent, or Firm* — Sughrue Mion, PLLC

(57) ABSTRACT

Provided is a powder supply device for a secondary battery which can always supply a fixed amount of powder with high accuracy without being influenced by a state of the powder. In addition, provided is an apparatus for manufacturing an electrode body, which includes the powder supply device and can efficiently manufacture an electrode body. The powder supply device includes a rotor which makes powder fall into an opening, and a mesh body which covers the lower end of the opening. Uneven portions or projecting
(Continued)

portions are formed on the outer circumferential surface of the rotor. The rotor is rotatably supported in a storing portion. The gap is formed between the outer circumferential surface of the rotor and the inner surface of the storing portion so that they are spaced apart. The mesh body is arranged away from the outer circumferential surface of the rotor.

9 Claims, 10 Drawing Sheets

(51) Int. Cl.
  *H01M 4/04* (2006.01)
  *B05C 19/04* (2006.01)
  *B05C 9/06* (2006.01)
  *B05C 9/12* (2006.01)
  *B05C 19/06* (2006.01)
  *H01T 19/00* (2006.01)

(52) U.S. Cl.
  CPC .............. *B05C 19/06* (2013.01); *H01M 4/043* (2013.01); *H01T 19/00* (2013.01); *Y10T 29/53204* (2015.01)

(58) Field of Classification Search
  CPC ......... B05C 19/04; B05C 19/06; B28B 11/04; B28B 11/06; B41M 1/125; B41M 1/22; B41M 1/28; B41M 1/42; H01M 4/043; H01M 4/402; H01M 4/435
  USPC .......................... 29/729, 742, 749; 222/410
  See application file for complete search history.

(56) References Cited

U.S. PATENT DOCUMENTS

| | | | |
|---|---|---|---|
| 6,513,663 B1 | 2/2003 | Nilsson | |
| 7,542,697 B2* | 6/2009 | Matsumoto | G03G 15/0898 222/DIG. 1 |
| 8,295,742 B2* | 10/2012 | Yamaguchi | G03G 15/0863 399/12 |

FOREIGN PATENT DOCUMENTS

| | | | |
|---|---|---|---|
| GB | 2273923 A | | 7/1994 |
| JP | 2002-193432 A | | 7/2002 |
| JP | 2002-521152 A | | 7/2002 |
| JP | 2003-155124 A | | 5/2003 |
| JP | 2004281221 A | * | 10/2004 |
| JP | 2007-5747 A | | 1/2007 |
| JP | 2012-7999 A | | 1/2012 |
| WO | 2011/117982 A1 | | 9/2011 |

\* cited by examiner

POWDER SUPPLY DEVICE FOR SECONDARY BATTERY AND APPARATUS FOR MANUFACTURING ELECTRODE BODY

CROSS REFERENCE TO RELATED APPLICATIONS

This application is a National Stage of International Application No. PCT/JP2013/75777 filed Sep. 24, 2013, claiming priority based on Japanese Patent Application No. 2012-210970, filed Sep. 25, 2012, the contents of all of which are incorporated herein by reference in their entirety.

TECHNICAL FIELD

The present invention relates to a technique on a powder supply device for a secondary battery and an apparatus for manufacturing an electrode body.

BACKGROUND ART

Conventionally, there have been developed powder supply device for supplying powder on a surface of a member such as a sheet or a plate in a uniformly distributed manner, and the powder supply device have been used in various industrial fields.

Such a powder supply device has been publicly known through the disclosure made in patent literature 1 described below, for example.

Patent literature 1 discloses a powder supply device which includes a hopper-shaped chute into which powder is charged, a rolling member arranged inside the chute, and a mesh body arranged below the chute.

In the powder supply device disclosed in patent literature 1, vibrations are applied to the chute into which the powder is charged, and the rolling member is rolled by the vibrations. In addition, the powder is dispersed through the mesh body. As a result, the powder is uniformly supplied to a predetermined range (width and length).

CITATION LIST

Patent Literature

Patent Literature 1: JP-A 2003-155124

SUMMARY OF INVENTION

Problem to be Solved by the Invention

However, in the powder supply device disclosed in patent literature 1, depending on a state of the powder (the degree of moisture, the degree of coherence and the like), the powder unevenly disperses even when the same vibrations are applied to the chute. Therefore, it is difficult to supply a fixed amount of the powder with high accuracy.

Further, there has been made an attempt to manufacture an electrode body for a secondary battery using such a conventional powder supply device by a dry technique where powder is supplied to the surface of a collector sheet which constitutes a secondary battery in a uniformly dispersed manner, and where the collector sheet is pressed together with the powder.

However, when the conventional powder supply device is used, a supply of the powder varies, and thereby a mixture layer with a uniform thickness cannot be formed. Therefore, it is difficult to use the conventional powder supply device for manufacturing the electrode body for a secondary battery.

The present invention has been made in view of the above-mentioned current problems. An object of the present invention is to provide a powder supply device for a secondary battery which can always supply a fixed amount of powder with high accuracy without being influenced by a state of the powder. Another object of the present invention is to provide an apparatus for manufacturing an electrode body, which includes the above-mentioned powder supply device for a secondary battery and can efficiently manufacture an electrode body.

Means for Solving the Problem

Problems to be solved by the invention are as described above, and means for solving these problems are explained below.

A first aspect of the invention is a powder supply device for a secondary battery, including a case having a storing portion which is a gap for storing powder which is a material to be supplied and a rectangular opening communicating with the storing portion, the opening being formed on a lower end portion of the case. The powder supply device is configured so that the powder is discharged from the opening, and is supplied to a member to which the powder is to be supplied and which is moved horizontally in an area vertically below the opening while being fallen from the opening. The powder supply device includes a rotor which makes the powder fall into the opening, and a mesh body which covers a lower end of the opening and allows the powder in the opening to pass therethrough. A plurality of uneven portions or a plurality of projecting portions are formed on an outer circumferential portion of the rotor parallel to an axial direction of the rotor and at equal intervals in a circumferential direction. The rotor is rotatably supported in the storing portion so that an axis of the rotor is parallel to a width direction of the opening as viewed in a plan view and is arranged horizontally. A gap which constitutes a conveyance passage for the powder is formed between the outer circumferential portion of the rotor and an inner surface of the storing portion so that a distance between the outer circumferential portion and the inner surface becomes a fixed value. The mesh body is arranged at a fixed distance from the outer circumferential portion of the rotor.

Preferably, the powder supply device further includes a leveling mechanism which horizontally levels an upper surface of the powder supplied into the storing portion and stacked on an upper portion of the rotor.

Preferably, the rotor is a roller member having a circular column. An outer circumferential surface of the rotor and a plurality of grooves formed on the outer circumferential surface constitute the plurality of uneven portions. The plurality of grooves are arranged parallel to an axial direction of the roller member and at equal intervals in a circumferential direction of the roller member.

Preferably, the grooves are formed in arcs in a cross section perpendicular to the axial direction of the rotor.

Preferably, the powder supply device further includes a discharge electrode for applying a corona discharge to the mesh body. The discharge electrode is arranged below the mesh body.

A second aspect of the invention is an apparatus for manufacturing an electrode body, which includes the above-mentioned powder supply device. The apparatus includes a powder pressing mechanism for pressing the powder supplied to a surface of the member in a thickness direction of the member. The powder contains an active material for forming the electrode body which constitutes a secondary battery. The member is a collector sheet for forming the electrode body which constitutes the secondary battery.

Effects of the Invention

The present invention exerts the following effects.

A powder supply device for a secondary battery according to the present invention makes it possible to supply a fixed amount of powder to a member to which the powder is to be supplied regardless of a state of the powder.

Further, the powder supply device for a secondary battery according to the present invention makes it possible to prevent deviation in distribution of the powder to be supplied to the member caused by clogging of the mesh body.

An apparatus for manufacturing an electrode body according to the present invention makes it possible to efficiently manufacture the electrode body by a dry technique.

Accordingly, a step for manufacturing a secondary battery can be shortened and a cost required to manufacture the secondary battery can be reduced.

BRIEF DESCRIPTION OF DRAWINGS

FIG. 5 shows a rotor constituting the supplying part, in which

FIG. 6 shows another embodiment of the supplying part, in which

FIG. 8 is a view for explaining the phase difference among rotors, in which

DESCRIPTION OF EMBODIMENTS

Hereinafter, a powder supply device 1 according to a first embodiment of the present invention is explained with reference to FIG. 1 to FIG. 6.

In the powder supply device 1 according to the first embodiment of the present invention explained hereinafter, the number of supply systems for powder 10 (i.e., the number of discharge openings for powder) is set to only one system.

Figure 1:
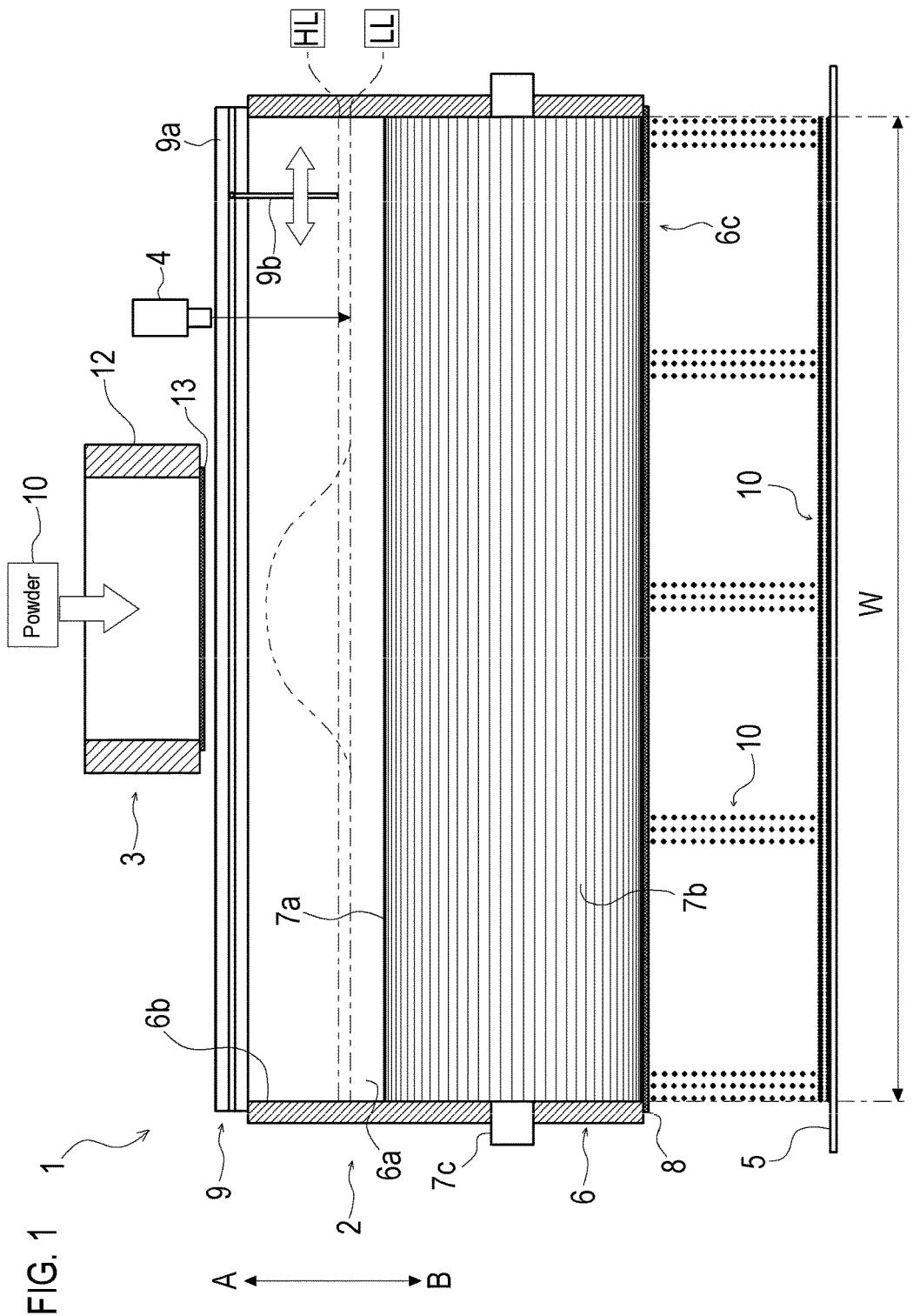
FIG. 1 is a cross-sectional front view showing a first embodiment of a powder supply device according to the present invention.
Figure 2:
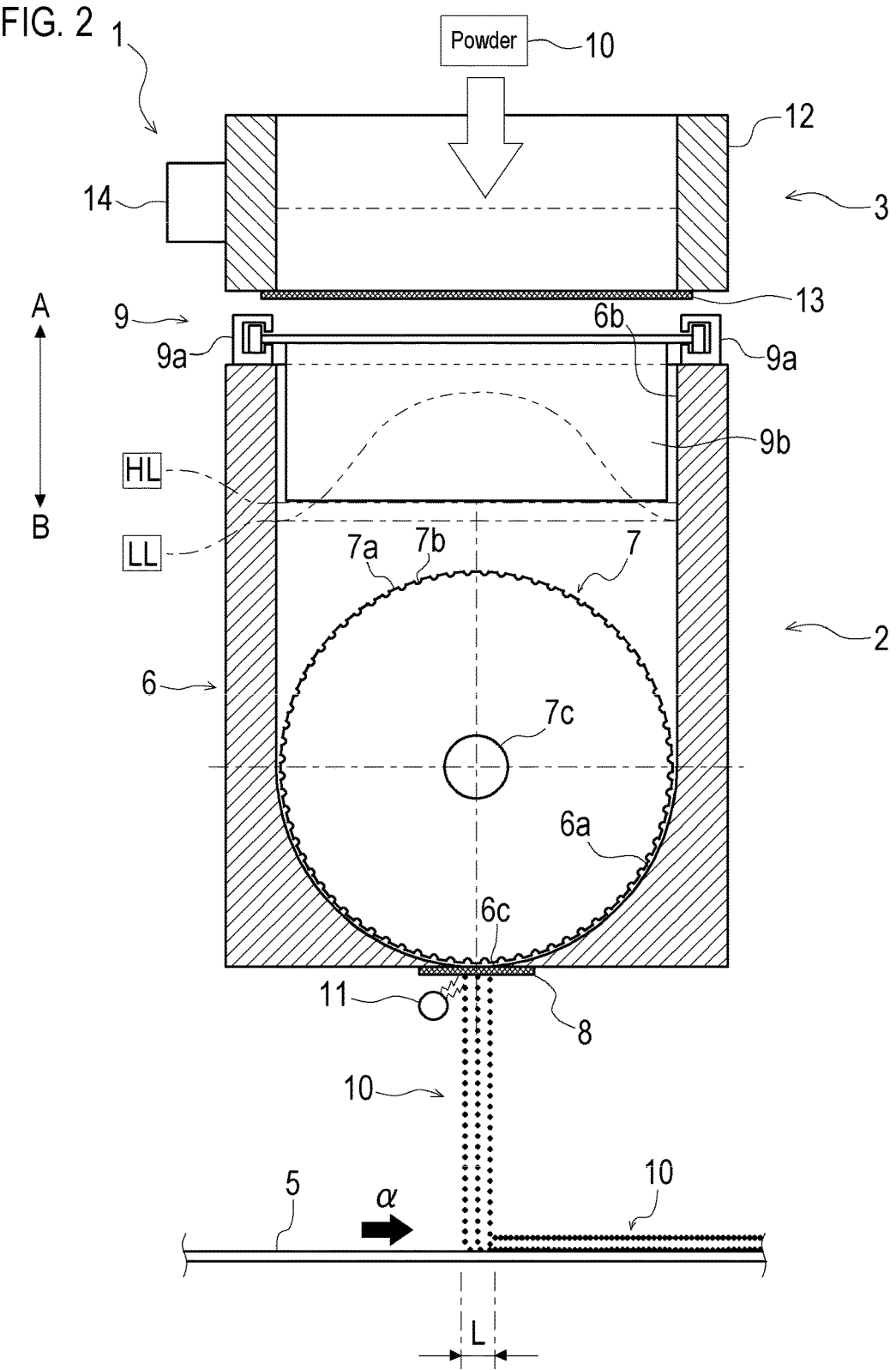
FIG. 2 is a cross-sectional side view showing the first embodiment of the powder supply device according to the present invention.

In the explanation made hereinafter, the direction indicated by an arrow A in FIG. 1 and FIG. 2 is defined as the vertically upward direction, and the direction indicated by an arrow B in FIG. 1 and FIG. 2 is defined as the vertically downward direction. The powder supply device 1 is configured to supply the powder in the downward direction from above.

As shown in FIG. 1 and FIG. 2, the powder supply device 1 according to the first embodiment of the present invention can supply the powder 10 at a fixed amount to a member 5 to which the powder 10 is to be supplied. The powder supply device 1 includes a supplying part 2, a powder replenishing portion 3, and a powder amount detection sensor 4.

In the powder supply device 1 according to the first embodiment of the present invention, as shown in FIG. 2, the member 5 to which the powder 10 is to be supplied is movable in a predetermined feeding direction α at a fixed speed.

As shown in FIG. 1, the powder supply device 1 is configured so that an amount of the powder 10 stored in the supplying part 2 is detected by the powder amount detection sensor 4. When an amount of the powder 10 is decreased, the powder replenishing portion 3 replenishes the powder 10 to the supplying part 2.

In the powder supply device 1 described in this embodiment, an ultrasonic sensor is adopted as the powder amount detection sensor 4. As the powder amount detection sensor 4, it is preferable to use a sensor which can detect a level of a top of the powder 10 in a non-contact manner such as an ultrasonic sensor or an infrared sensor.

The supplying part 2 is configured to be able to supply a fixed amount of the powder 10 continuously to the member 5 to which the powder 10 is to be supplied, and includes a case 6, a rotor 7, a mesh body 8, and a leveling mechanism 9.

The supplying part 2 is arranged just below the powder replenishing portion 3, and is configured so that the powder 10 falling from the powder replenishing portion 3 can be received by the case 6.

The supplying part 2 is configured so that the powder 10 discharged from the case 6 falls on the member 5 moving in the predetermined feeding direction α vertically below the case 6 thus supplying the powder 10 to the member 5.

As a mode of "falling" of the powder 10, a mode exists where the powder 10 naturally falls due to an own weight or a mode where the powder 10 falls by being pushed and biased by the rotor 7.

The case 6 is a container in which the powder 10 supplied from the powder replenishing portion 3 is temporarily stored, and a storing portion 6a which is a gap portion for storing the powder 10 is formed in the case 6.

In the case 6, an inlet opening 6b which is an opening for introducing the powder 10 into the storing portion 6a is formed on an upper end portion of the storing portion 6a, and a discharge opening 6c which is an opening for discharging the powder 10 is formed on a lower end portion of the storing portion 6a.

As shown in FIG. 1 and FIG. 2, the discharge opening 6c is formed as a rectangular opening having a size L in the length direction (short side direction in this embodiment)

and a size W in the width direction (long side direction in this embodiment). The discharge opening 6c communicates with the storing portion 6a.

A lower end surface of the discharge opening 6c is formed horizontally so that an amount of the powder 10 discharged from the discharge opening 6c becomes uniform among respective portions of the discharge opening 6c.

The discharge opening 6c is formed so that the length direction of the discharge opening 6c is arranged parallel to the feeding direction α of the member 5, and as viewed in a plan view, the width direction of the discharge opening 6c is arranged perpendicular to the feeding direction α of the member.

In this embodiment, "fixed amount" means that a weight per unit area of the powder 10 discharged from the discharge opening 6c is uniform at an arbitrary portion of the discharge opening 6c.

In other words, the powder supply device 1 is configured so that, in a state where the powder 10 supplied to the member 5 from the supplying part 2 is adhered to a powder supply surface of the member 5, a weight of the powder 10 per unit area on the powder supply surface becomes a fixed value.

Figure 3:
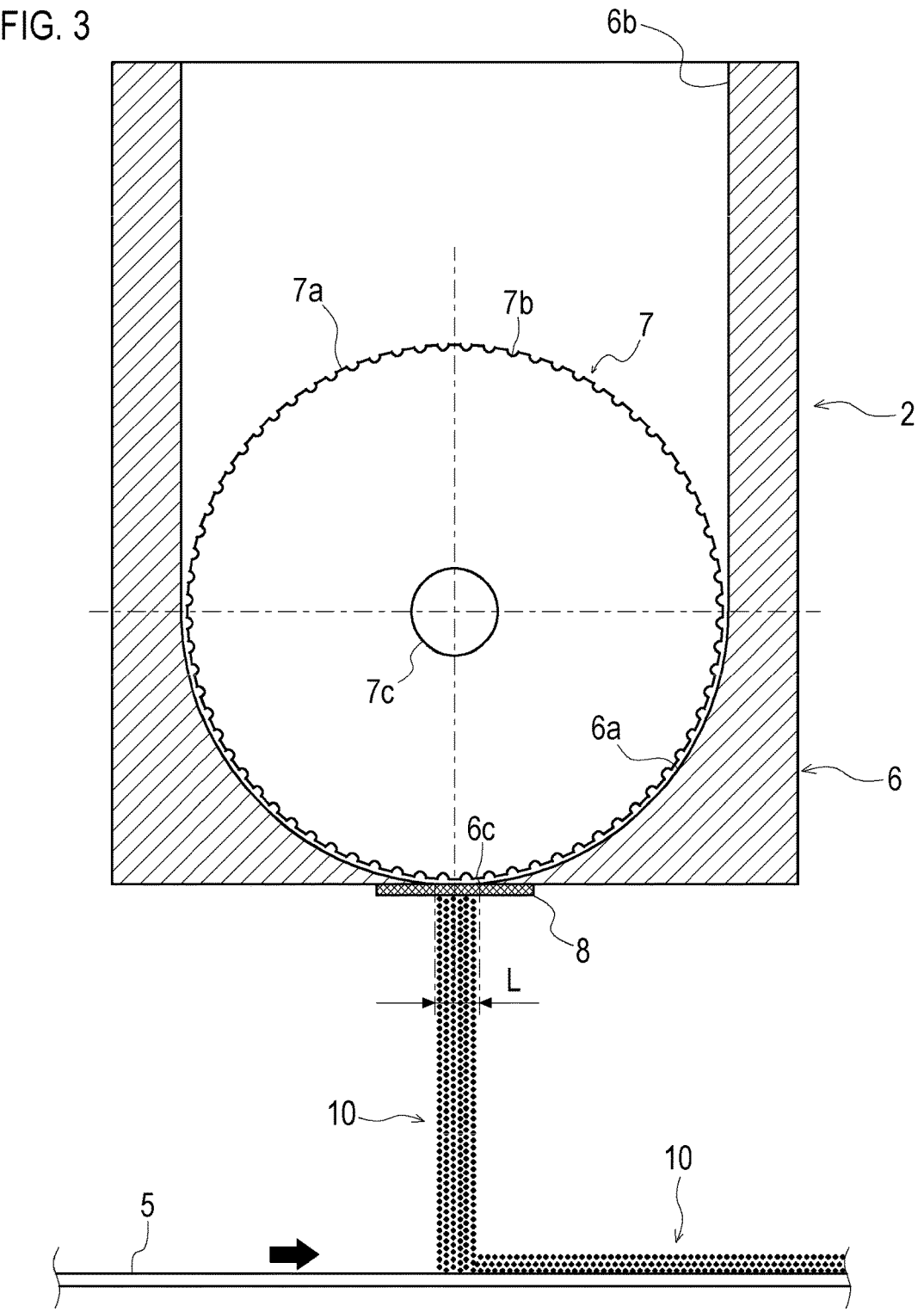
FIG. 3 shows a supplying part of the powder supply device.

As shown in FIG. 3, the rotor 7 is arranged in the storing portion 6a of the case 6.

In this embodiment, the rotor 7 is formed of a roller member having an substantially circular column. A shaft portion 7c of the rotor 7 is arranged parallel to the width direction of the discharge opening 6c and perpendicular to the feeding direction α of the member 5 as viewed in a plan view. The rotor 7 is horizontally supported in a mode where the rotor 7 is rotatable about the shaft portion 7c.

A plurality of grooves 7b are formed on an outer circumferential surface 7a of the rotor 7 parallel to the axial direction of the rotor 7 at equal intervals in the circumferential direction of the rotor 7. The rotor 7 is configured so that the powder 10 is introduced into the grooves 7b and along with the rotation of the rotor 7, the powder 10 is conveyed in the rotational direction of the rotor 7.

In other words, a plurality of uneven portions are formed on the outer circumferential portion of the rotor 7 at equal intervals in the circumferential direction by the outer circumferential surface 7a and the grooves 7b.

Figure 4:
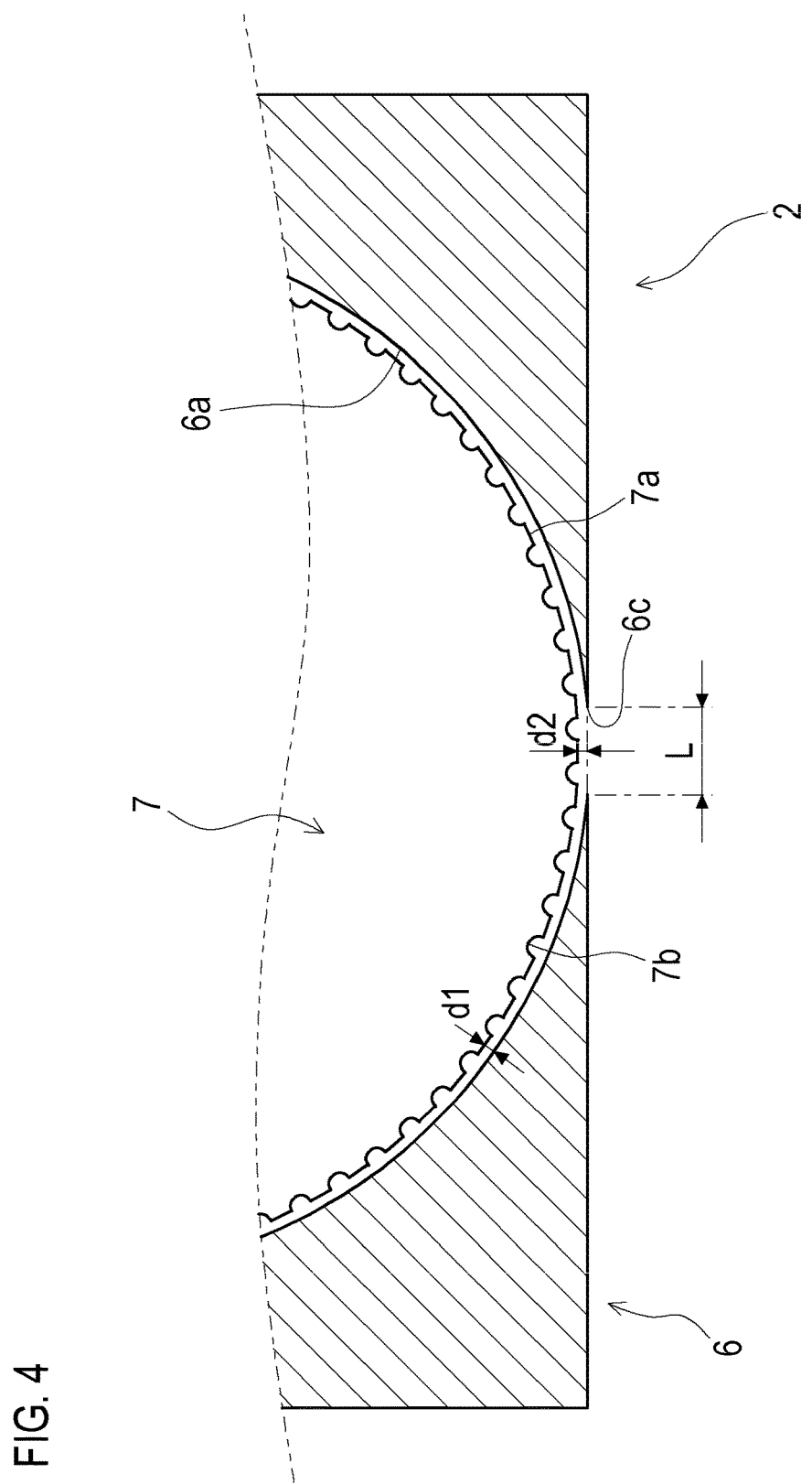
FIG. 4 is a partially enlarged view showing the structure of a portion around a discharge opening of the supplying part.

As shown in FIG. 4, a bottom portion of the storing portion 6a is formed into an arc which is concentric with the outer circumferential surface 7a of the rotor 7 (i.e., using the shaft portion 7c as an axial position), and a uniform gap which makes the outer circumferential surface 7a and the storing portion 6a spaced apart from each other by a distance d1 is formed between the outer circumferential surface 7a and the storing portion 6a.

Due to such a structure, the supplying part 2 minimizes deviation in the flow of the powder 10 when the supplying part 2 conveys the powder 10 along the gap formed between the storing portion 6a of the case 6 and the rotor 7.

The outer circumferential surface 7a of the rotor 7 is spaced apart from a position of a lower end of the discharge opening 6c of the case 6 by a distance d2.

Due to such a structure, when the powder 10 conveyed to the discharge opening 6c along the gap formed between the storing portion 6a and the rotor 7 is dispersed in the discharge opening 6c, the supplying part 2 minimizes deviation in the flow of the powder 10.

The rotor 7 is arranged between the inlet opening 6b and the discharge opening 6c in the storing portion 6a. Along with the rotation of the rotor 7, the powder 10 stacked in an area above the rotor 7 (i.e., the inlet opening 6b side) can be conveyed to an area below the rotor 7 (i.e., a discharge opening 6c side).

As shown in FIG. 1 and FIG. 2, the leveling mechanism 9 is a mechanism for forming a top of the powder 10 into an substantially flat shape by leveling the powder 10 which is stacked in a mountain shape above the rotor 7. The leveling mechanism 9 includes a pair of slide rails 9a and a leveling plate 9b.

In the powder supply device 1 according to the first embodiment of the present invention, the mesh body 8 for evenly dividing the discharge opening 6c in a mesh shape is disposed below the discharge opening 6c so that the mesh body 8 covers the whole surface of the discharge opening 6c. The mesh body 8 is arranged away from the outer circumferential surface 7a of the rotor 7 by the distance d2.

By making the powder 10 fallen from the discharge opening 6c pass through the mesh body 8, the powder 10 which has a possibility of forming a lump in the course of conveyance can be surely dispersed, and consequently the distribution and the density of the powder 10 can be made uniform. Therefore, a weight of the powder 10 adhered to the surface of the member 5 can be made uniform in a more reliable manner.

Further, in the powder supply device 1 according to the first embodiment of the present invention, a discharge electrode 11 which is a means for removing the powder 10 with which the mesh body 8 is clogged is disposed below the mesh body 8.

The discharge electrode 11 can apply a corona discharge to the mesh body 8, and is arranged within a range corresponding to the width W of the discharge opening 6c.

By continuously or periodically applying a discharge to the mesh body 8 by the discharge electrode 11, the powder 10 stagnated in the mesh body 8 can be removed. This makes it possible to prevent variation in an amount of the powder 10 supplied by the powder supply device 1. In addition, this makes it possible to prevent deviation in distribution of the powder 10 supplied through the mesh body 8.

As described above, the powder supply deice 1 according to the first embodiment of the present invention has the discharge electrode 11 for applying the corona discharge to the mesh body 8 below the mesh body 8.

This makes it possible to prevent deviation in the distribution of the powder 10 supplied to the member 5, which is caused by the clogging of the mesh body 8.

Figure 5A:
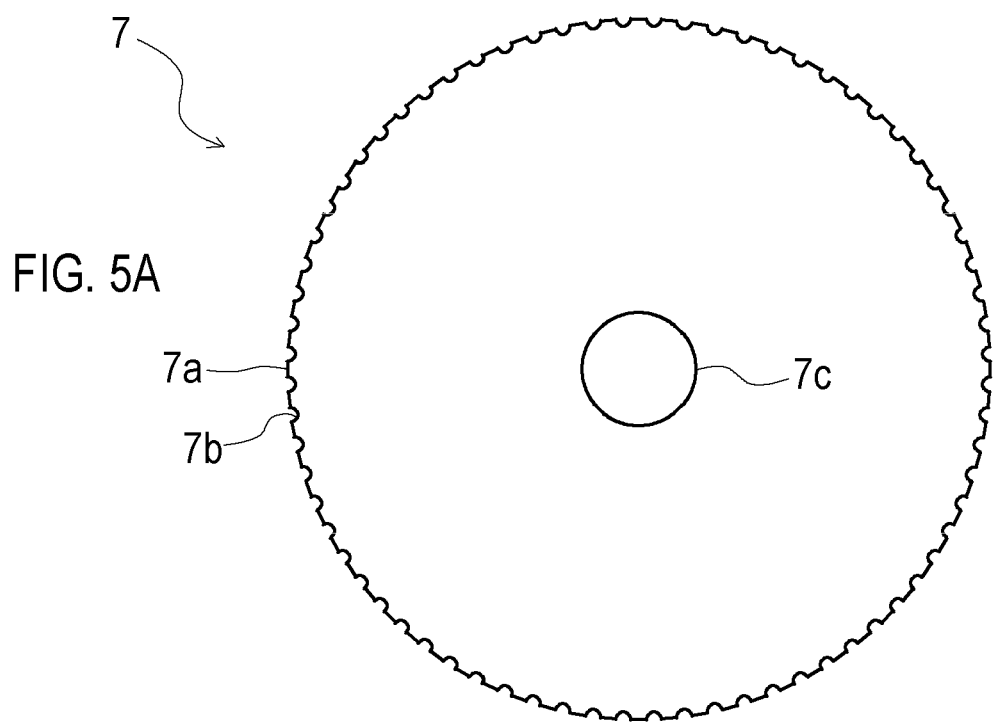
FIG. 5A is a side view.
Figure 5B:
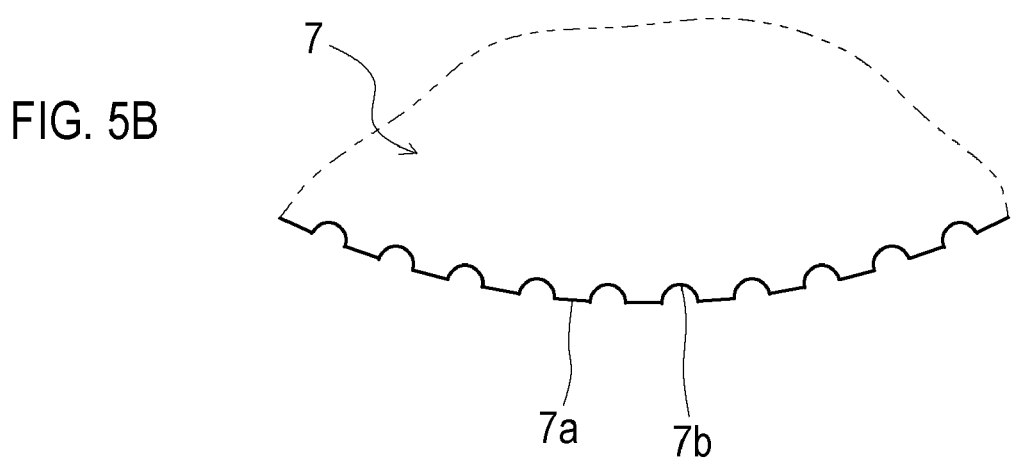
FIG. 5B is an enlarged view of a side portion of the rotor.

As shown in FIG. 5, each of the grooves 7b formed on the outer circumferential surface 7a of the rotor 7 has arc-like shape in cross section perpendicular to the axis of the rotor 7.

By forming each of the grooves 7b into arc-like shape, even when the powder 10 introduced into the grooves 7b is pressed between the storing portion 6a and the grooves 7b, the powder 10 is not adhered to the grooves 7b and hence, the powder 10 can be easily removed from the grooves 7b.

Assume a case where the powder 10 is adhered to the inside of the groove 7b. In this case, an amount of the powder 10 falling into the discharge opening 6c along with the rotation of the rotor 7 varies. Therefore, it is desirable to adopt a shape formed of only a curved surface (arc-like shape or the like) as in the case of the groove 7b.

It is preferable that the grooves 7b be formed parallel to the axis of the rotor 7.

Assume the case where the grooves 7b are formed in an inclined manner with respect to the axial direction of the rotor 7. In this case, along with the rotation of the rotor 7, a stress acting in the axial direction is imparted to the powder 10 introduced into the grooves 7b. Therefore, deviation occurs in the distribution of the powder 10 in the width direction of the discharge opening 6c, which makes it difficult to uniformly discharge the powder 10 from the discharge opening 6c.

The powder replenishing portion 3 is a portion for replenishing the powder 10 to the supplying part 2, and includes a frame 12, a mesh body 13 and a vibration generator 14.

The frame 12 is an substantially rectangular frame member having an opening which penetrates the frame 12 in the vertical direction, and the mesh body 13 which covers a whole opening formed in a lower surface of the frame 12 is mounted on the frame 12.

The vibration generator 14 is mounted on the frame 12. By operating the vibration generator 14, the frame 12 and the mesh body 13 can be vibrated in a desired direction with predetermined amplitude.

Due to such a structure, by supplying the powder 10 into the inside of the frame 12 while vibrating the frame 12 and the mesh body 13 by operating the vibration generator 14, it is possible to supply the powder 10 to the supplying part 2 arranged below the powder replenishing portion 3 while sieving the supplied powder 10 by the mesh body 13.

The powder 10 can be stacked inside the frame 12 (i.e., above the mesh body 13) corresponding to a height of the frame 12. The supply of the powder 10 to the supplying part 2 from the powder replenishing portion 3 can be started or stopped in response to turning on or off of the vibration generator 14.

The interlocking movement of the supplying part 2 and the powder replenishing portion 3 is explained.

For example, as shown in FIG. 1 and FIG. 2, when the powder amount detection sensor 4 detects that a stacking height (the position of the top) of the powder 10 stacked on the rotor 7 is lowered to a lower limit level LL, the vibration generator 14 is operated for a predetermined time by a control device (not shown) so that a predetermined amount of the powder 10 is replenished to the supplying part 2 by the powder replenishing portion 3.

Immediately after the powder 10 is replenished to the supplying part 2, the powder 10 is stacked in a mountain shape just below the powder replenishing portion 3. Therefore, the leveling mechanism 9 is operated after the vibration generator 14 is stopped by the control device (not shown) to reciprocate the leveling plate 9b in the horizontal direction, thus leveling the top of the stacked powder 10 substantially horizontally.

When the powder amount detection sensor 4 confirms that the level of the top of the powder 10 reaches a predetermined upper limit level HL, the leveling mechanism 9 is stopped by the control device (not shown).

In this manner, by adjusting the stacking height of the powder 10 stacked above the rotor 7 to a predetermined level (i.e., within a range from the upper limit level HL to the lower limit level LL) over the whole length of the rotor 7 and by leveling the top of the powder 10 substantially horizontally, a pressure acting on the powder 10 due to an own weight of the powder 10 can be made substantially uniform in respective portions of the discharge opening 6c.

Due to such an operation, along with the rotation of the rotor 7, a fixed amount of the powder 10 can be discharged from the discharge opening 6c.

As described above, the powder supply device 1 where the rotor 7 which is a roller member formed in a substantially circular column is provided to the supplying part 2 is exemplified. However, the rotor provided to the powder supply device 1 may be a rotor 17 having the hollow structure as shown in FIG. 6A, for example.

Figure 6A:
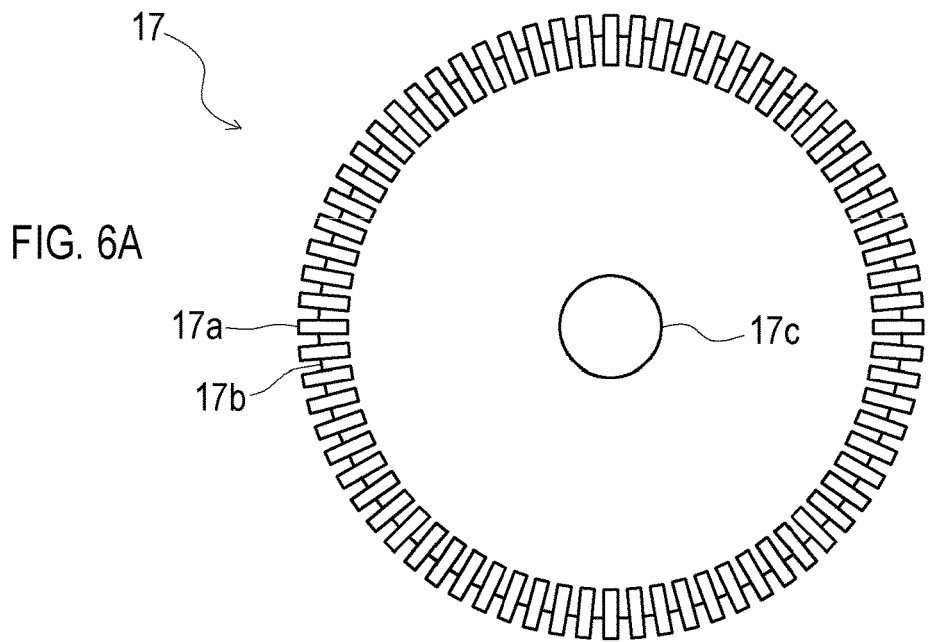
FIG. 6A shows another embodiment of the rotor (in the case where the rotor is hollow)

As shown in FIG. 6A, the rotor 17 which is a modification of the rotor includes: a rotary shaft 17c; a pair of plates 17b fixed to both end portions of the rotary shaft 17c in the longitudinal direction; and a plurality of (seventy two pieces in this embodiment) blade members 17a which are fixed to the pair of plates 17b and are radially arranged around the rotary shaft 17c.

The blade members 17a project toward the outside from an outer circumferential portion of the plate 17b.

Specifically, a plurality of projecting portions are formed on the outer circumferential portion of the rotor 17 at equal intervals by the blade members 17a.

The supplying part provided with the rotor 17 is configured so that, along with the rotation of the rotor 17 about the axis of the rotary shaft 17c, a top portion and side portions of each blade member 17a scrape off the powder 10 present in the vicinity of an inner surface of the storing portion 6a and convey the powder 10.

As the structure of the rotor in the powder supply device 1, other structures may be adopted as described below.

Figure 6B:
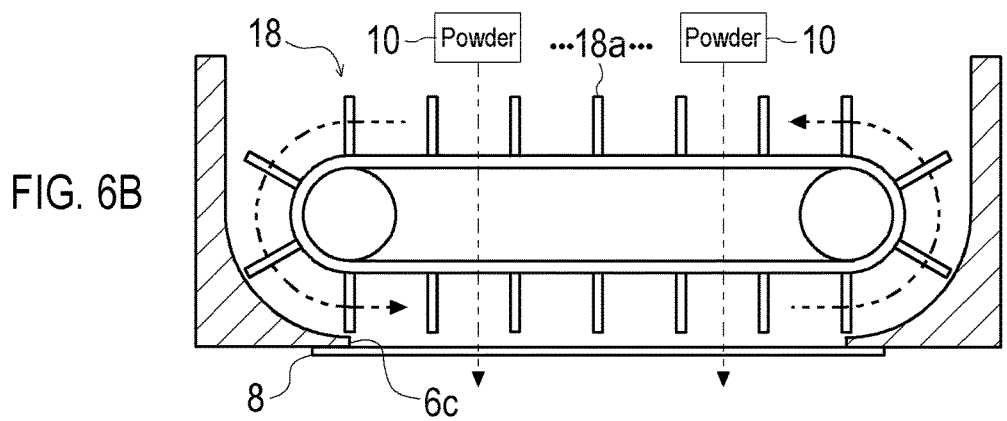
FIG. 6B shows another embodiment of the rotor (in the case where the rotor has an endless belt shape)

For example, as shown in FIG. 6B, the rotor may be configured so that plate members 18a which scrape off the powder 10 are attached to a rotor 18 having an endless belt shape and circulating on an substantially elongated circular trajectory.

Figure 6C:
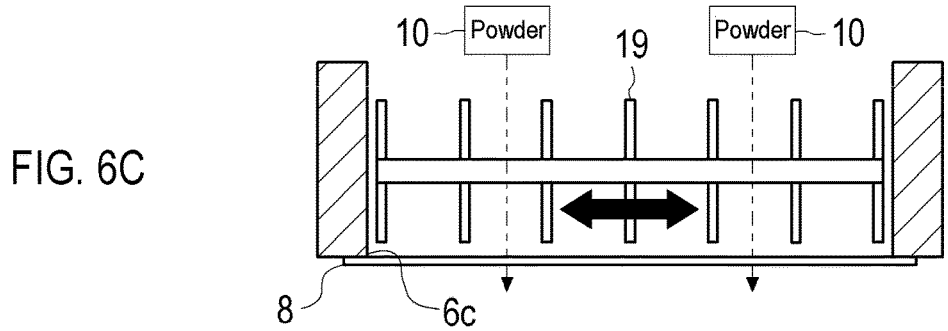
FIG. 6C shows a case where a comb-shaped vibrator is used.

Further, as shown in FIG. 6C, it may be possible to adopt the structure where the powder 10 in a case is uniformly dispersed toward a discharge opening 6c by vibrating a vibrator 19 which is a comb-shaped member in a reciprocating manner in the horizontal direction in place of the structure which discharges a fixed amount of powder using a rotor.

In this embodiment, the powder supply device 1 provided with the powder replenishing portion 3 which is a portion for replenishing the powder 10 to the supplying part 2 is exemplified. However, it is also possible to use the supplying part 2 in place of the powder replenishing portion 3, for example.

Specifically, it is possible to adopt the structure where two supplying parts 2 are arranged in a vertically stacked manner, and a fixed amount of the powder 10 is replenished to the supplying part 2 on a lower side from the supplying part 2 on an upper side. In this case, a replenishing amount of the powder 10 to the supplying part 2 on a lower side can be controlled with high accuracy and hence, it is possible to expect an advantageous effect that a supply amount of the powder 10 to the member 5 can be set to a fixed value with more accuracy.

The powder supply device 1 according to the first embodiment of the present invention includes the case 6 having the storing portion 6a which is a gap for storing the powder 10 which is a material to be supplied and the discharge opening 6c constituting the rectangular opening communicating with the storing portion 6a, the discharge opening 6c being formed on the lower end portion of the case 6. The powder supply device 1 is configured so that the powder 10 is discharged from the discharge opening 6c, and is supplied to the member 5 to which the powder 10 is to be supplied and which is moved parallel to the length direction of the discharge opening 6c and horizontally in an area vertically below the discharge opening 6c while being fallen from the discharge opening 6c. The powder supply device 1 includes the rotor 7 (or the rotor 17) which makes the powder 10 fall into the discharge opening 6c, and the mesh body 8 which covers the lower end of the discharge opening 6c and allows the powder 10 having fallen into the discharge opening 6c to pass therethrough. The outer circumferential surface 7a and the grooves 7b which constitute the plurality of uneven portions (or the plurality of blade members 17a which constitute the plurality of projecting portions) are formed on the outer circumferential portion of the rotor 7 (or the rotor 17) parallel to the axial direction of the rotor 7 (or the rotor 17) and at equal intervals in the circumferential direction. The rotor 7 is rotatably supported in the storing portion 6a so that the axis of the rotor 7 is parallel to the width direction of the discharge opening 6c as viewed in a plan view and is arranged horizontally. The gap which constitutes the conveyance passage for the powder 10 is formed between the outer circumferential surface 7a of the rotor 7 and the inner surface of the storing portion 6a so that the outer circumferential surface 7a and the inner surface of the storing portion 6a are spaced apart from each other by a distance d1. The mesh body 8 is arranged away from the outer circumferential surface 7a of the rotor 7 by the distance d2.

The powder supply device 1 according to the first embodiment of the present invention further includes the leveling mechanism 9 which levels substantially horizontally an upper surface of the powder 10 supplied into the storing portion 6a and stacked on the upper portion of the rotor 7 which is a roller member.

In the powder supply device 1 according to the first embodiment of the present invention, the rotor 7 is the roller member having an substantially circular column. The outer circumferential surface 7a of the rotor 7 and the plurality of grooves 7b formed on the outer circumferential surface 7a constitute the plurality of uneven portions, and the plurality of grooves 7b are arranged parallel to an axial direction of the rotor 7 and at equal intervals in a circumferential direction.

In the powder supply device 1 according to the first embodiment of the present invention, the grooves 7b are formed in arcs in a cross section perpendicular to the axial direction of the rotor 7 which is the roller member.

Due to such a structure, a fixed amount of the powder 10 can be supplied to the member 5 regardless of a state of the powder 10 (the degree of moisture, the degree of coherence and the like).

Hereinafter, with reference to FIGS. 7 to 9, a powder supply device 21 according to the second embodiment of the present invention is described.

In the powder supply device 21 according to the second embodiment of the present invention described here, the number of supply systems of the powder 10 is set to a plural number (three systems in this embodiment), and layers of the powder 10 supplied to the member 5 is multi-layered so that the powder 10 can uniformly be adhered while ensuring a thickness of the powder 10 adhered to the member 5.

In the powder supply device 21 according to the second embodiment of the present invention, in the same manner as the powder supply device 1 according to the first embodiment, the member 5 moving at a fixed speed in the predetermined feeding direction α is set as a supply target of the powder 10.

Figure 7:
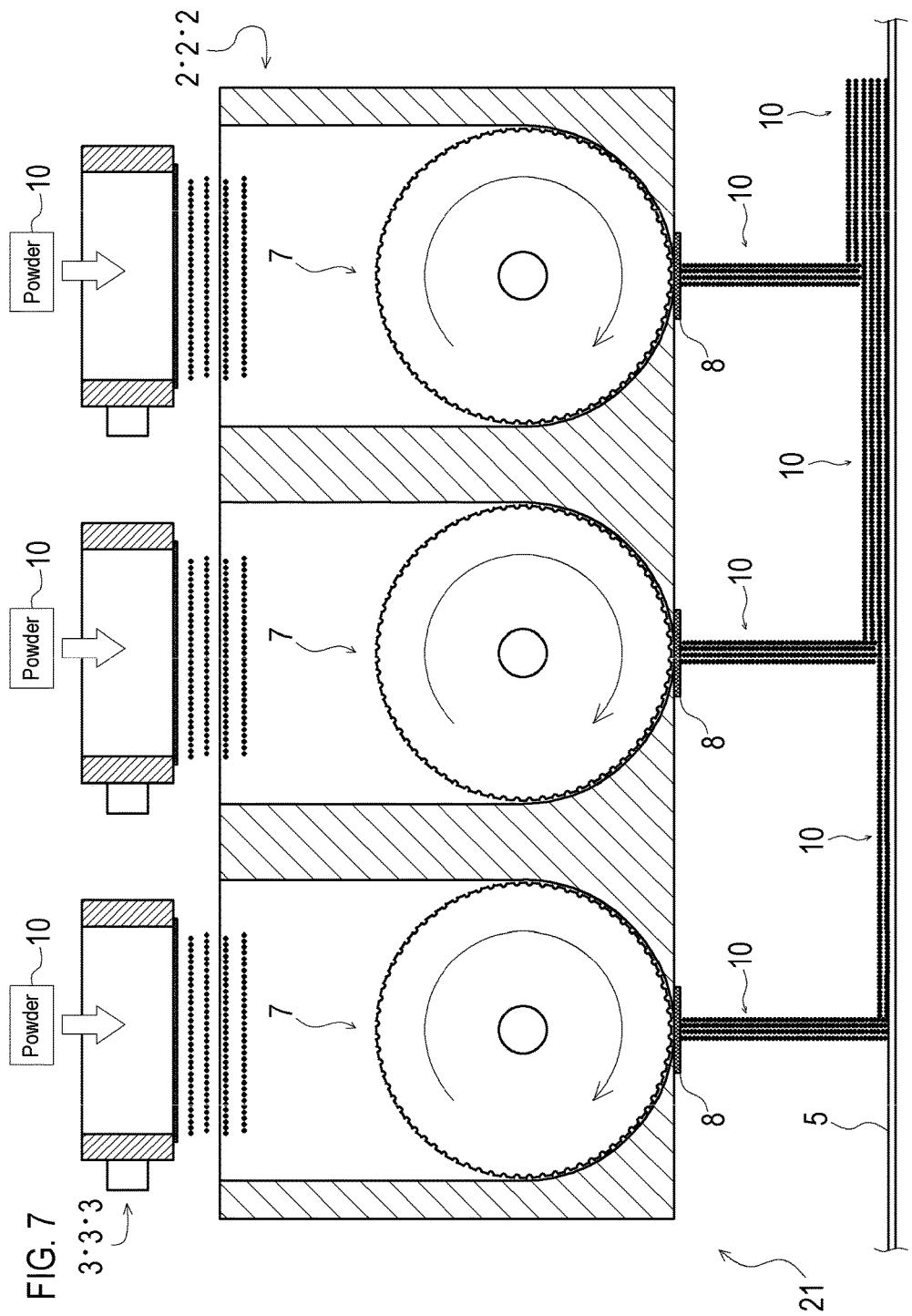
FIG. 7 shows a second embodiment of the powder supply device according to the present invention.

As shown in FIG. 7, the powder supply device 21 according to the second embodiment of the present invention can supply the powder 10 at a fixed rate to the member 5 to which the powder 10 is to be supplied, and a plurality of (three in this embodiment) powder supply devices 1 according to the first embodiment are arranged in series in the direction of feeding direction α of the member 5.

In the powder supply device 21 according to the second embodiment of the present invention, the phases of three rotors 7 in three supplying parts 2 are set different from each other.

The phase of the rotor 7 is described.

Figure 8A:
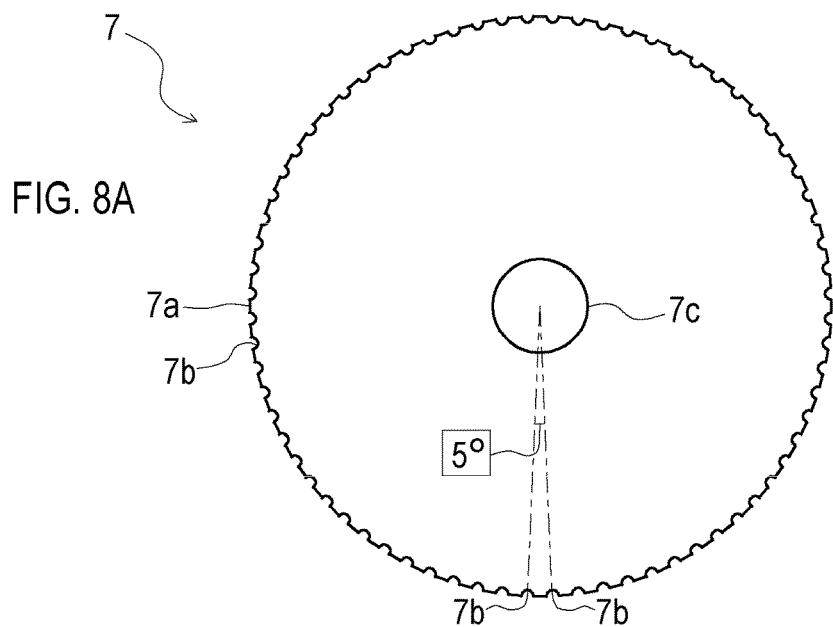
FIG. 8A shows the structure of grooves in a rotor according to the second embodiment of the present invention.

As shown in FIG. 8A, seventy two grooves 7b are formed on the outer circumferential surface 7a of the rotor 7 provided to the powder supply device 21 in the circumferential direction at equal intervals.

In other words, in the rotor 7, the grooves 7b are formed in an angularly displaced manner at an angle of 5 degrees.

Figure 8B:
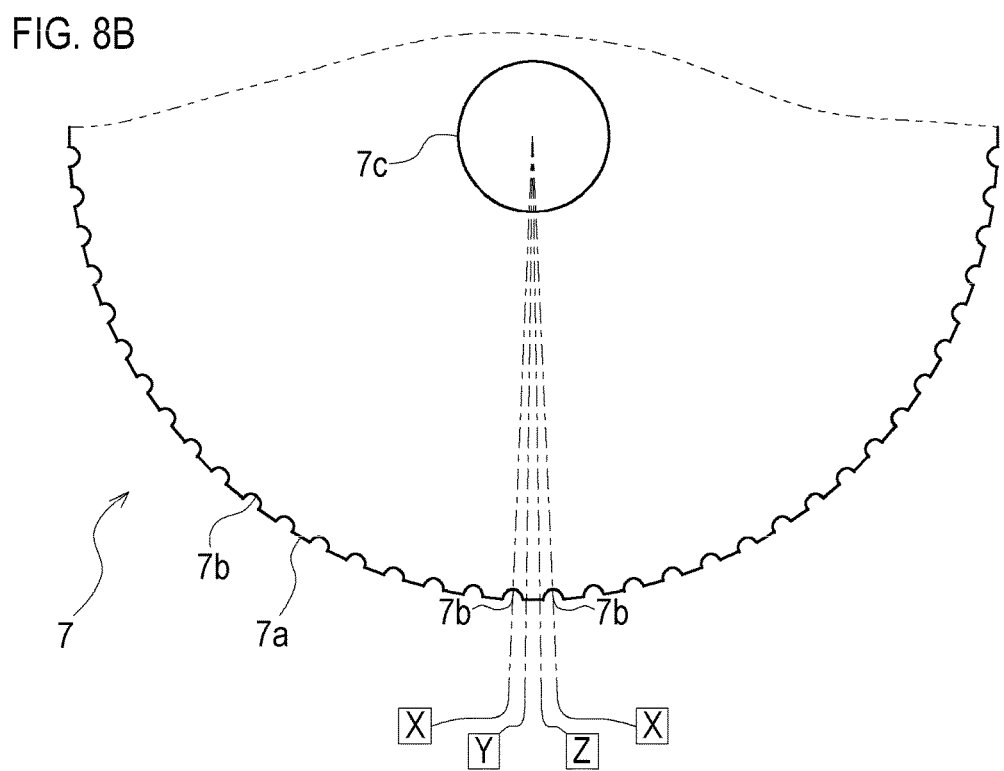
FIG. 8B shows the phase difference (5/3 degrees) among the rotors according to the second embodiment of the present invention.

Accordingly, in the powder supply device 21, in order to prevent the rotors 7 from taking the same phase (rotational position) within a range of 5 degrees, the phases of the three rotors 7 are displaced from each other by 5/3 degrees (see FIG. 8B).

Figure 9:
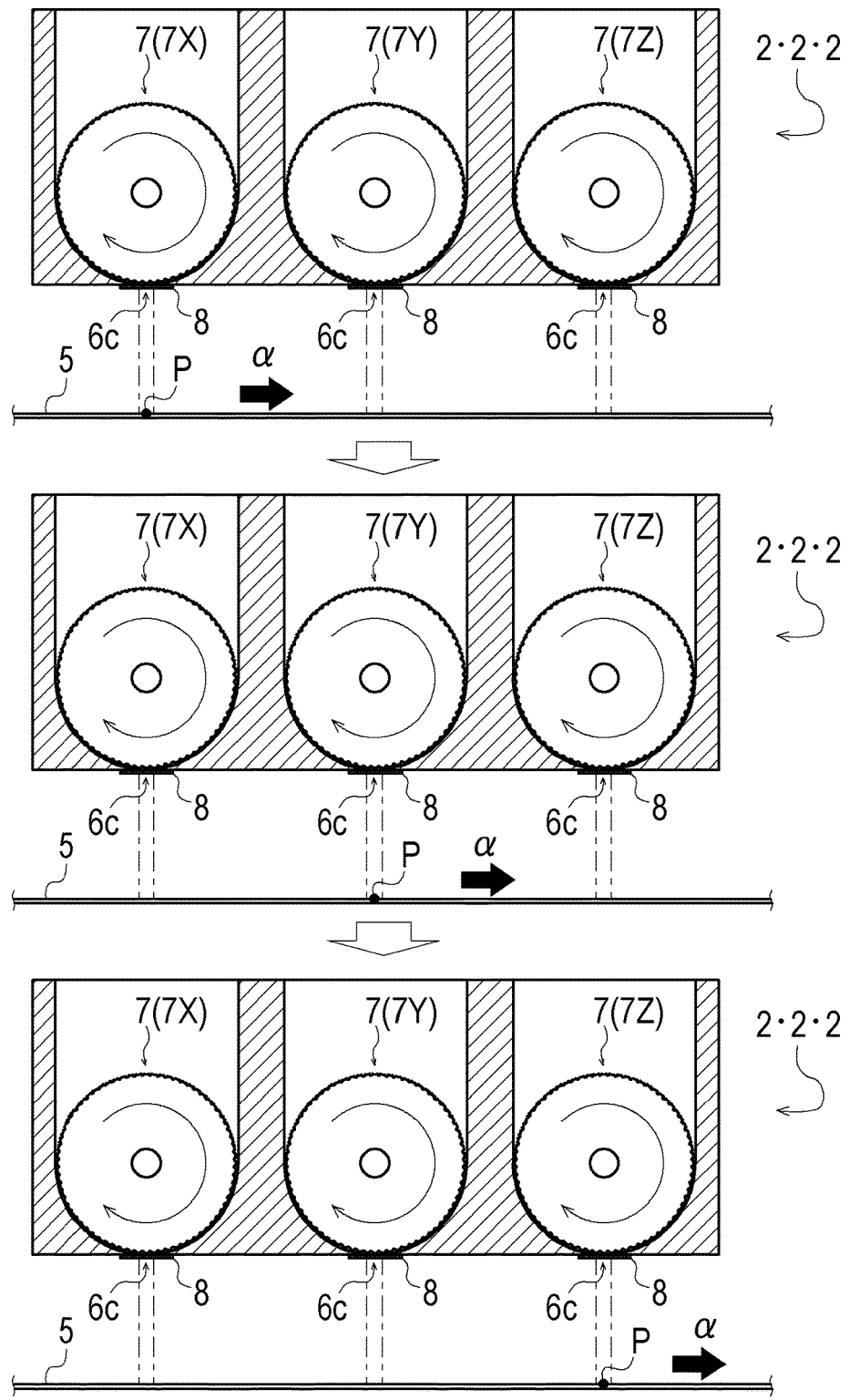
FIG. 9 shows the phase of each rotor in the powder supply device according to the second embodiment of the present invention.

As shown in FIG. 9, to exemplify a supply state of the powder 10 at a point P of the member 5, when the point P of the member 5 passes a position directly below the discharge opening 6c at the first supplying part 2 positioned on the most upstream side in the feeding direction α of the member 5, the first rotor 7 (hereinafter described as rotor 7X) is configured so that the phase X shown in FIG. 8B is positioned vertically below.

When the point P of the member 5 passes a position directly below the discharge opening 6c at the second supplying part 2 positioned at the center in the feeding direction α of the member 5, the second rotor 7 (hereinafter described as rotor 7Y) is configured so that the phase Y shown in FIG. 8B is positioned vertically below and is made different from the phase X of the first rotor 7X.

When the point P of the member 5 passes a position directly below the discharge opening 6c at the third supplying part 2 positioned on the most downstream side in the feeding direction α of the member 5, the third rotor 7 (hereinafter described as rotor 7Z) is configured so that the phase Z shown in FIG. 8B is positioned vertically below and is made different from the phases X and Y of the rotors 7X and 7Y.

In this manner, the phases of the first to third rotors 7X, 7Y and 7Z are different with respect to the same point P of the member 5, thus enabling to prevent deviation of the supply of the powder 10 caused by the shape of the rotor 7, and to uniformly supply the powder 10 even when a supply amount of the powder 10 to the member 5 is increased.

In this embodiment, the case is exemplified where the grooves 7b are formed at equal intervals in an angularly displaced manner at an angle of 5 degrees, and the phases of the rotors 7X, 7Y and 7Z are set different from each other within a range of 5 degrees. However, the structure of the rotor 7 in the powder supply device 21 according to the second embodiment of the present invention is not limited to such a case.

In other words, the phase difference of the rotors 7 can be decided in accordance with the number of grooves 7b formed on the rotor 7 and the number of supplying parts 2 in the powder supply device 21.

Further, in this embodiment, the case is exemplified where the phase differences of the rotors 7X, 7Y and 7Z are set uniform (5/3 degrees), it is not always necessary to set the phase differences of the rotors 7X, 7Y and 7Z uniform. It is sufficient that the phases of the rotors 7X, 7Y and 7Z are set different from each other, when the same point P passes the positions directly below three discharge openings 6c corresponding to the rotors 7X, 7Y and 7Z.

Hereinafter, an apparatus 31 provided with the powder supply device 21 according to the second embodiment of the present invention is described with reference to FIG. 10.

The apparatus 31 according to one embodiment described below includes the powder supply device 21 according to the second embodiment of the present invention described previously, and manufactures, using the powder supply device 21 by a dry technique, an electrode body 40 (positive and negative electrodes) which constitutes a secondary battery.

Figure 10:
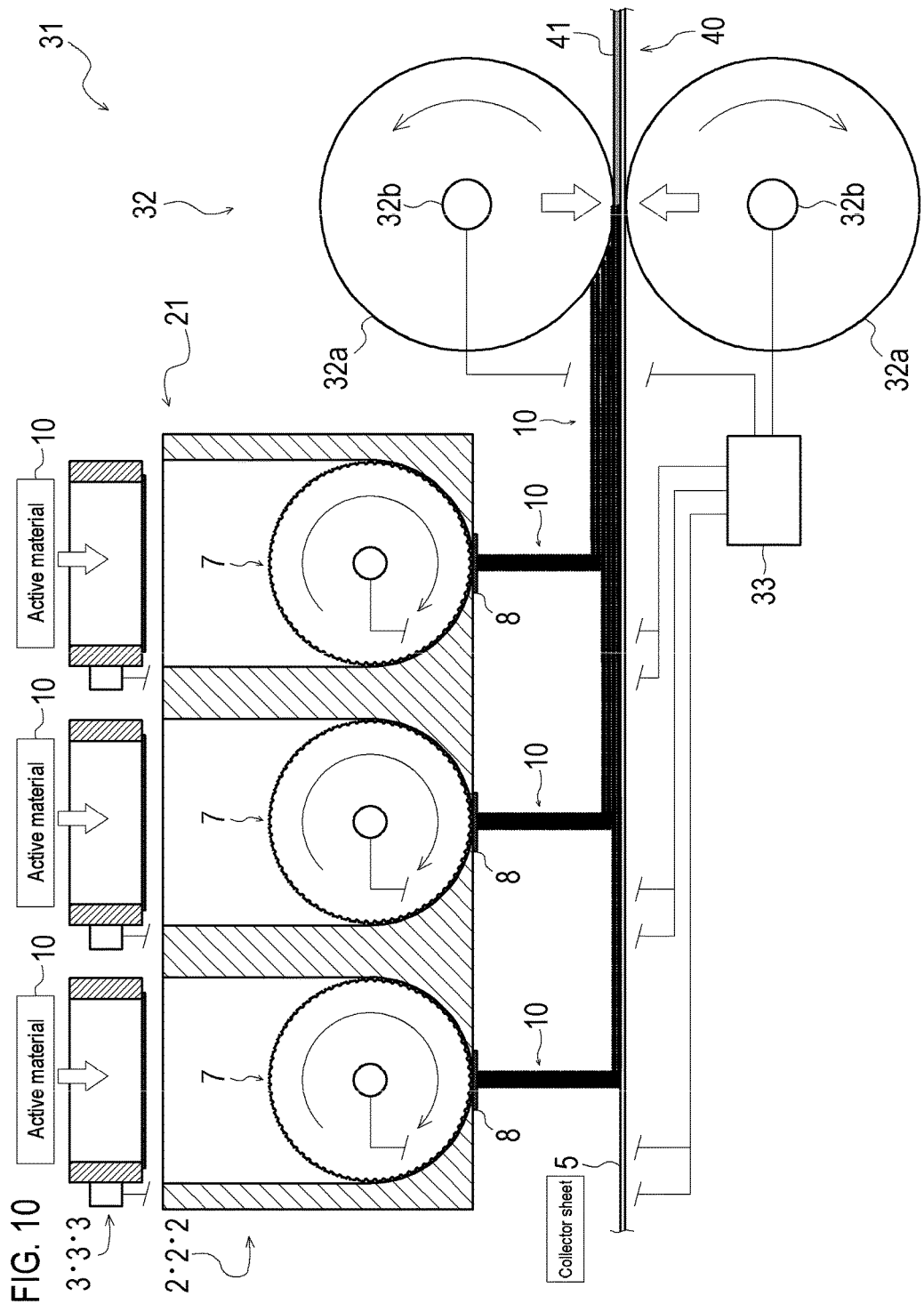
FIG. 10 shows the whole structure of an apparatus for manufacturing an electrode body according to one embodiment of the present invention.

As shown in FIG. 10, the apparatus 31 according to one embodiment of the present invention manufactures the electrode body 40 (positive and negative electrodes) which constitutes the secondary battery, and includes the powder supply device 21, a powder pressing mechanism 32 and a control device 33.

A member 5 used in the apparatus 31 in one embodiment of the present invention is a collector sheet, and a fixed amount of the powder 10 is supplied to a surface of the member 5 by the powder supply device 21.

The powder 10 used in the apparatus 31 according to one embodiment of the present invention contains an active material (for example, graphite which constitutes a negative electrode active material or the like) for forming a mixture layer 41 of the electrode body 40. A fixed amount of the powder 10 containing an active material is adhered to a surface of the member 5 as a layer with a fixed thickness and fixed density by the powder supply device 21.

The powder pressing mechanism 32 is a mechanism for forming the mixture layer 41 of the electrode body 40 by pressing the powder 10 adhered to the surface of the member 5 as a layer, and includes a pair of rollers 32a. The pair of rollers 32a is rotatably supported on two rotary shafts 32b.

The powder pressing mechanism 32 detects a distance between the rotary shafts 32b by a sensor (not shown), and inputs the distance to the control device 33. The control device 33 calculates a thickness of the formed mixture layer 41 based on a diameter of rollers 32a and the distance between the rotary shafts 32b at real time.

In the apparatus 31, the control device 33 controls, based on the calculated thickness of the mixture layer 41, rotational speeds of the rotors 7 and operations of the vibration generator 14 and the like, and adjusts the thickness of the mixture layer 41 so that the thickness falls within a predetermined prescribed value.

The apparatus 31 forms the mixture layer 41 by pressing the uniform layer made of an active material formed on the surface of the member 5 by the powder pressing mechanism 32, and manufactures the electrode body 40 by a drying technique.

With the use of such an apparatus 31, various steps (mixing step, defoaming step and the like) for manufacturing a paste for an electrode and a step of drying a paste which has been necessary conventionally can be also omitted and hence, an electrode body can be efficiently manufactured by a drying technique.

The apparatus 31 according to one embodiment of the present invention includes the powder supply device 21. The powder 10 contains an active material for forming the electrode body 40 which constitutes a secondary battery. The member 5 is a collector sheet for forming the electrode body 40 which constitutes a secondary battery. The apparatus 31 further includes the powder pressing mechanism 32 for pressing the powder 10 supplied to the surface of the member 5 in the thickness direction of the member 5.

Due to such a structure, the electrode body 40 can be efficiently manufactured by a drying technique.

Further, due to such a structure, a step for manufacturing a secondary battery can be shortened, and a cost required to manufacture a secondary battery can be reduced.

As described above, the powder supply device 21 (or powder supply device 1) is exemplified as the device which constitutes the apparatus 31 for manufacturing the electrode body 40 for a secondary battery. However, the application of the powder supply device 21 (or the powder supply device 1) is not limited to such an application, and the powder supply device 21 can be used for manufacturing foods, chemical products, medicines and the like, for example.

INDUSTRIAL APPLICABILITY

The present invention is applicable to a powder supply device for a secondary battery and an apparatus for manufacturing an electrode body.

REFERENCE SIGNS LIST

1: powder supply device (first embodiment)
2: supplying part
3: powder replenishing portion
4: powder amount detection sensor
5: member
6: case
6a: storing portion
6c: discharge opening
7: rotor
7b: groove
8: mesh body
9: leveling mechanism
10: powder
21: powder supply device (second embodiment)
31: apparatus
32: powder pressing mechanism

The invention claimed is:

1. A powder supply device for a secondary battery, including a case having a storing portion which is a gap for storing powder which is a material to be supplied and a rectangular opening communicating with the storing portion, the rectangular opening being formed on a lower end portion of the case, which is configured so that the powder is discharged from the rectangular opening, and is supplied to a member to which the powder is to be supplied and which is moved horizontally in an area vertically below the rectangular opening while being fallen from the rectangular opening, the powder supply device comprising:
  a rotor which makes the powder fall into the rectangular opening; and
  a mesh body which covers a lower end of the rectangular opening and allows the powder in the rectangular opening to pass therethrough,
  wherein a plurality of uneven portions or a plurality of projecting portions are formed on an outer circumferential portion of the rotor parallel to an axial direction of the rotor and at equal intervals in a circumferential direction,
  wherein the rotor is rotatably supported in the storing portion so that an axis of the rotor is parallel to a width direction of the rectangular opening as viewed in a plan view and is arranged horizontally,
  wherein the gap which constitutes a conveyance passage for the powder is formed between the outer circumferential portion of the rotor and an inner surface of the storing portion so that a distance between the outer circumferential portion and the inner surface becomes a fixed value, and wherein the mesh body is arranged at a fixed distance from the outer circumferential portion of the rotor and the entire mesh body is disposed on an outside of the case.

2. The powder supply device for a secondary battery according to claim 1, further comprising:
a leveling mechanism which horizontally levels an upper surface of the powder supplied into the storing portion and stacked on an upper portion of the rotor.

3. The powder supply device for a secondary battery according to claim 1, wherein
the rotor is a roller member having a circular column,
an outer circumferential surface of the rotor and a plurality of grooves formed on the outer circumferential surface constitute the plurality of uneven portions, and
the plurality of grooves are arranged parallel to an axial direction of the roller member and at equal intervals in a circumferential direction of the roller member.

4. The powder supply device for a secondary battery according to claim 3, wherein
the plurality of grooves are formed in arcs in a cross section perpendicular to the axial direction of the rotor.

5. The powder supply device for a secondary battery according to claim 1, further comprising:
a discharge electrode for applying a corona discharge to the mesh body,
wherein the discharge electrode is arranged below the mesh body.

6. The powder supply device for a secondary battery according to claim 1, wherein the gap is formed between the plurality of uneven portions or the plurality of projecting portions and the inner surface of the storing portion so that a distance between the plurality of uneven portions or the plurality of projecting portions and the inner surface becomes a fixed value.

7. The powder supply device for a secondary battery according to claim 1, wherein the mesh body is arranged at a fixed distance from the plurality of uneven portions or the plurality of projecting portions.

8. The powder supply device for a secondary battery according to claim 1, further comprising:
a leveling mechanism configured to form an upper surface of the powder, the upper surface being in a mounded shape, into a horizontally flat shape.

9. An apparatus for manufacturing an electrode body, which includes the powder supply device for a secondary battery according to claim 1, comprising:
a powder pressing mechanism for pressing the powder supplied to a surface of the member in a thickness direction of the member,
wherein the powder contains an active material for forming the electrode body which constitutes a secondary battery, and
wherein the member is a collector sheet for forming the electrode body which constitutes the secondary battery.

* * * * *